(12) United States Patent
Lin et al.

(10) Patent No.: US 11,583,925 B2
(45) Date of Patent: Feb. 21, 2023

(54) METHOD FOR CONTINUOUSLY PREPARING NANOPARTICLES COMPRISING A NOBLE METAL OR AN ALLOY THEREOF

(71) Applicant: Jiangnan University, Jiangsu (CN)

(72) Inventors: Liangliang Lin, Jiangsu (CN); Xuanhe Li, Jiangsu (CN); Hujun Xu, Jiangsu (CN)

(73) Assignee: JIANGNAN UNIVERSITY, Wuxi (CN)

( * ) Notice: Subject to any disclaimer, the term of this patent is extended or adjusted under 35 U.S.C. 154(b) by 7 days.

(21) Appl. No.: 17/387,694

(22) Filed: Jul. 28, 2021

(65) Prior Publication Data

US 2022/0048111 A1 Feb. 17, 2022

(30) Foreign Application Priority Data

Aug. 14, 2020 (CN) .......................... 202010815801.9

(51) Int. Cl.
*B22F 9/24* (2006.01)
*B22F 1/054* (2022.01)
(Continued)

(52) U.S. Cl.
CPC ............... *B22F 9/24* (2013.01); *B22F 1/054* (2022.01); *B22F 2301/255* (2013.01);
(Continued)

(58) Field of Classification Search
None
See application file for complete search history.

(56) References Cited

U.S. PATENT DOCUMENTS

2006/0042414 A1* 3/2006 Sankaran .................. B22F 9/30
  75/346
2014/0227176 A1* 8/2014 Marc-Andre .......... C01G 45/02
  422/186.04
2019/0358708 A1* 11/2019 Mariotti ..................... B22F 9/24

FOREIGN PATENT DOCUMENTS

CN       101342600 A       1/2009
CN       102909388 A       2/2013
(Continued)

OTHER PUBLICATIONS

English translation of JP-2019094541 (originally published Jun. 20, 2019) obtained from PE2E search.*

(Continued)

*Primary Examiner* — George Wyszomierski
(74) *Attorney, Agent, or Firm* — Muncy, Geissler, Olds & Lowe, P.C.

(57) ABSTRACT

A method for continuously preparing nanoparticles including a noble metal or an alloy thereof belongs to the technical field of preparation of inorganic nanomaterials. A three-way quartz tube microreactor is designed; noble metal solutions used as raw materials are continuously inputted into the microreactor by injection pumps; and a plasma technology is coupled to form discharge in the microreactor to directly prepare nanoparticles including a noble metal or an alloy thereof. The device and the method have low energy consumption, wide operation range, safety, high efficiency, green and environmental protection. The synthesized nanoparticles have high purity, small size, narrow particle size distribution and adjustable components.

7 Claims, 7 Drawing Sheets

(51) Int. Cl.
    *B82Y 30/00*     (2011.01)
    *B82Y 40/00*     (2011.01)

(52) U.S. Cl.
    CPC ......... *B22F 2304/054* (2013.01); *B82Y 30/00* (2013.01); *B82Y 40/00* (2013.01)

(56) References Cited

FOREIGN PATENT DOCUMENTS

| | | | |
|---|---|---|---|
| CN | 10333145 A | | 10/2013 |
| CN | 113237867 A | * | 8/2021 |
| JP | 2019094541 A | * | 6/2019 |
| KR | 102131887 B1 | * | 7/2020 |

OTHER PUBLICATIONS

English translation of KR-102131887-B1 (originally publidshed Jul. 8, 2020) obtained from PE2E search.*
English translation of CN-113237867 (originally published Aug. 10, 2021) obtained from PE2E search.*
Office Action (with English translation) corresponding to Chinese application No. 202010815801.9 dated Jun. 1, 2021. (pp. 10).
Notification of Grant (with English translation) corresponding to Chinese application No. 202010815801.9 dated Jul. 6, 2021. (pp. 4).

* cited by examiner

METHOD FOR CONTINUOUSLY PREPARING NANOPARTICLES COMPRISING A NOBLE METAL OR AN ALLOY THEREOF

TECHNICAL FIELD

The present invention belongs to the technical field of preparation of inorganic nanomaterials, and particularly relates to a method for continuously preparing nanoparticles comprising a noble metal or an alloy thereof.

BACKGROUND

Nanoparticles are particles with a particle size of 1-100 nm, and have been widely used in the fields of low temperature thermal conductive materials, fluorescent materials and photoelectric devices due to high surface activity and electrical and catalytic performance. Particularly, the unique surface plasma resonance phenomenon of noble metal nanomaterials shows excellent optical performance. In recent years, gas-liquid plasma has gradually become a novel strengthening technology for green synthesis of nanoparticles comprising a noble metal or an alloy thereof. In the technology, with a precursor solution containing noble metal as raw material, high energy electrons and active particles in plasma (such as ions, free radicals, metastable atoms and radiation photons) act with reactants to directly obtain nanoparticles comprising a noble metal or an alloy thereof. The electrons are used as reducing agents in the process so that the reaction is completed in microseconds and chemical reducing agents and stabilizing agents are avoided. In addition, because of low liquid phase temperature and rapid heat dissipation, the agglomeration among the nanoparticles can be effectively reduced and inhibited to obtain a product with high purity and small particle size. In recent years, the microchannel technology has been gradually found as a method for preparing nanomaterials in addition to the gas-liquid plasma. The microchannel technology replaces intermittent operation with continuous flow, realizes continuous preparation of the nanoparticles in a microreactor with a feature size of 1 μm to 1 mm, and has the advantages of narrow residence time distribution, high heat and mass transfer rate, stable product quality and good uniformity. In addition, the flow rate of each reactant can be accurately controlled to synthesize multielement alloy nanomaterial with specific composition. If the two technologies are coupled, it is expected to prepare high-quality nanoparticles in a green, efficient and continuously controllable manner.

The patent CN102909388A discloses a method for preparing gold and silver alloy nanoparticles by using a hybrid reaction solution of silver nitrate and chloroauric acid treated by microplasma. The method can only intermittently reduce the noble metal salt solution to obtain the corresponding nanoalloy materials, and is not conducive to large-scale application. The present invention can realize continuous preparation of the nanoparticles by coupling the microchannel technology and the plasma technology, regulate the flow speed of the solution through a microchannel, control the residence time of a precursor under the plasma to avoid heat accumulation, and obtain the nanoparticles with good uniformity and high purity.

The patent CN101342600A discloses a method for continuously preparing silver nanoparticles by reducing silver ions with plant water extract in a tubular reactor. The plant water extract of the invention has complicated preparation steps and weak reducing ability. In addition, the device involves a heating device, which increases the energy consumption. The present invention only needs a metal salt solution as the precursor and high-energy electrons as the reducing agents, which is convenient and efficient; and a series of binary (multielement) alloy nanoparticles can be prepared by regulating the type of the reactants. In addition, the reactor has simple structure and is easy to realize the regulation of the nanomaterial.

As a new method for preparing functional nanomaterial, the plasma has attracted more and more attention due to the advantages of normal pressure operation, high activity and nonequilibrium chemistry. At present, various metals, carbon materials, silicon materials and composite nanomaterials have been prepared by adjusting the structure of the plasma, a power supply, the precursor and the like. However, most of the existing plasma devices conduct intermittent operation, and cannot flexibly control the composition and the particle size of products; and the reactor is generally complicated and expensive.

SUMMARY

In order to solve the technical problem of the preparation, the present invention aims to prepare nanoparticles comprising a noble metal or an alloy thereof in a green, efficient and continuously controllable manner by coupling the microchannel technology and the plasma technology. The method has simple technology, safety, environmental protection, low power consumption, low reactor cost and narrow particle size distribution obtained, so as to flexibly regulate the composition and size of products and expect continuously controllable preparation of binary (multielement) noble metal alloy nanoparticles.

The technical solution of the present invention is as follows:

A device for continuously preparing nanoparticles comprising a noble metal or an alloy thereof comprises an argon cylinder 8, a mass flow control meter 3, injection pumps 1, a three-way valve 2, a three-way quartz tube microreactor 7, a plasma power supply 5, a ballast 6 and a stainless steel electrode 4; one end of the three-way quartz tube microreactor 7 is respectively connected with two injection pumps 1 through a microchannel; the two injection pumps 1 are respectively connected with a container A and a container B for delivering a precursor solution; the other end of the three-way quartz tube microreactor 7 is connected with a container C for product output; the upper end of a quartz tube of the three-way quartz tube microreactor 7 is provided with the stainless steel electrode 4 as a cathode; a metal coil is wound outside as a grounding anode; the three-way quartz tube microreactor 7, the plasma power supply 5 and the ballast 6 form a closed circuit; and the stainless steel electrode 4 is also connected with the mass flow control meter 3 and the argon cylinder 8 in sequence.

Further, a spacing between the cathode and the anode is kept at 2-3 mm.

Further, the stainless steel electrode 4 has a tube length of 50-100 mm, internal pipe diameter of 1-2.6 mm and external pipe diameter of 1.5-3.2 mm.

Further, the three-way quartz tube microreactor 7 has a total tube length of 70-150 mm, internal pipe diameter of 1.5-3.6 mm and external pipe diameter of 2-5 mm.

Further, the three-way valve 2 has an internal diameter of 1.5-3.2 mm.

Further, the microchannel for delivering the precursor solution is a polytetrafluoroethylene tube and has a tube length of 30-50 cm, internal pipe diameter of 1-3 mm and external pipe diameter of 1-3 mm.

A method for continuously preparing nanoparticles comprising a noble metal or an alloy thereof is completed by the device above-mentioned, couples a microreactor and a plasma technology, uses a noble metal solution as a precursor, continuously delivers the precursor solution into the three-way quartz tube microreactor 7 through the injection pumps 1 and rapidly reduces the reaction solution into nanoparticles under the action of the plasma. The preparation steps are as follows:

(1) preparing a noble metal precursor solution with a concentration of 0.01-5 mM noble metal precursor and deionized water as a solvent as the reaction solution, and adding 1%-5% of PVA into the reaction solution to ensure stable nanoparticles in a colloidal solution, wherein ratio of the volume of reaction solution to the volume of 1%-5% of PVA is 10:1 to 1:1; PVA is polyvinyl alcohol; 1%-5% of PVA is aqueous solution of PVA with a mass fraction of 1%-5%;

(2) coupling the microchannel and the plasma power supply using the three-way quartz tube microreactor 7, and introducing an atmosphere of argon into the microreactor through the mass flow control meter 3) to eliminate impurity gas in the microreactor;

(3) applying DC negative bias to the fixed stainless steel electrode 4 in the atmosphere of argon to ensure the plasma power of 10-20 W to break through the argon to generate the plasma;

(4) igniting the plasma and controlling the flow velocity of the precursor solution as 0.1-1 mL/min after the plasma is ignited, delivering the precursor solution to a plasma region, and rapidly reducing noble metal ions to generate nanoparticles nanoparticles under the action of the plasma;

(5) allowing the generated nanoparticles to flow out from the right end of the three-way quartz tube microreactor 7 under the push of the solution, and collecting the nanoparticles into the container C;

(6) centrifuging and drying the nanoparticles to obtain nanoparticles comprising a noble metal or an alloy thereof and having particle sizes of 3-8 nm.

Further, the noble metal precursor is one or more of silver nitrate, chloroauric acid, chloroplatinic acid, palladium chloride and palladium nitrate.

Further, the centrifuging is at a centrifugal speed of 8000-10,000 r/min and the drying is for a time of 4-8 hr at a temperature of 50-80° C.

Further, the concentration and the flow velocity of the precursor solution are regulated, and the size and the distribution of the noble metal and the alloy nanoparticles thereof are controlled.

Compared with the prior art, the present invention has the following advantages:

(1) Raw material is simple and a chemical reducing agent is not used, thereby reducing the production and purification processes of by-products and realizing green and environmental protection.

(2) The reaction is conducted at normal pressure and temperature; additional vacuum and separation devices are not needed; and the reactor has simple structure and low cost.

(3) The reaction is continuously controllable, efficient and rapid; and a series of binary (multielement) alloy nanoparticles can be prepared by controlling the flow rate and concentration of the reactants.

(4) The obtained nanoparticles have high purity, narrow particle size distribution and stable quality.

In the figures: 1 injection pump; 2 three-way valve; 3 mass flow control meter; 4 stainless steel electrode; 5 plasma power supply; 6 ballast; 7 three-way quartz tube microreactor; 8 argon cylinder.

DETAILED DESCRIPTION

Figure 1:
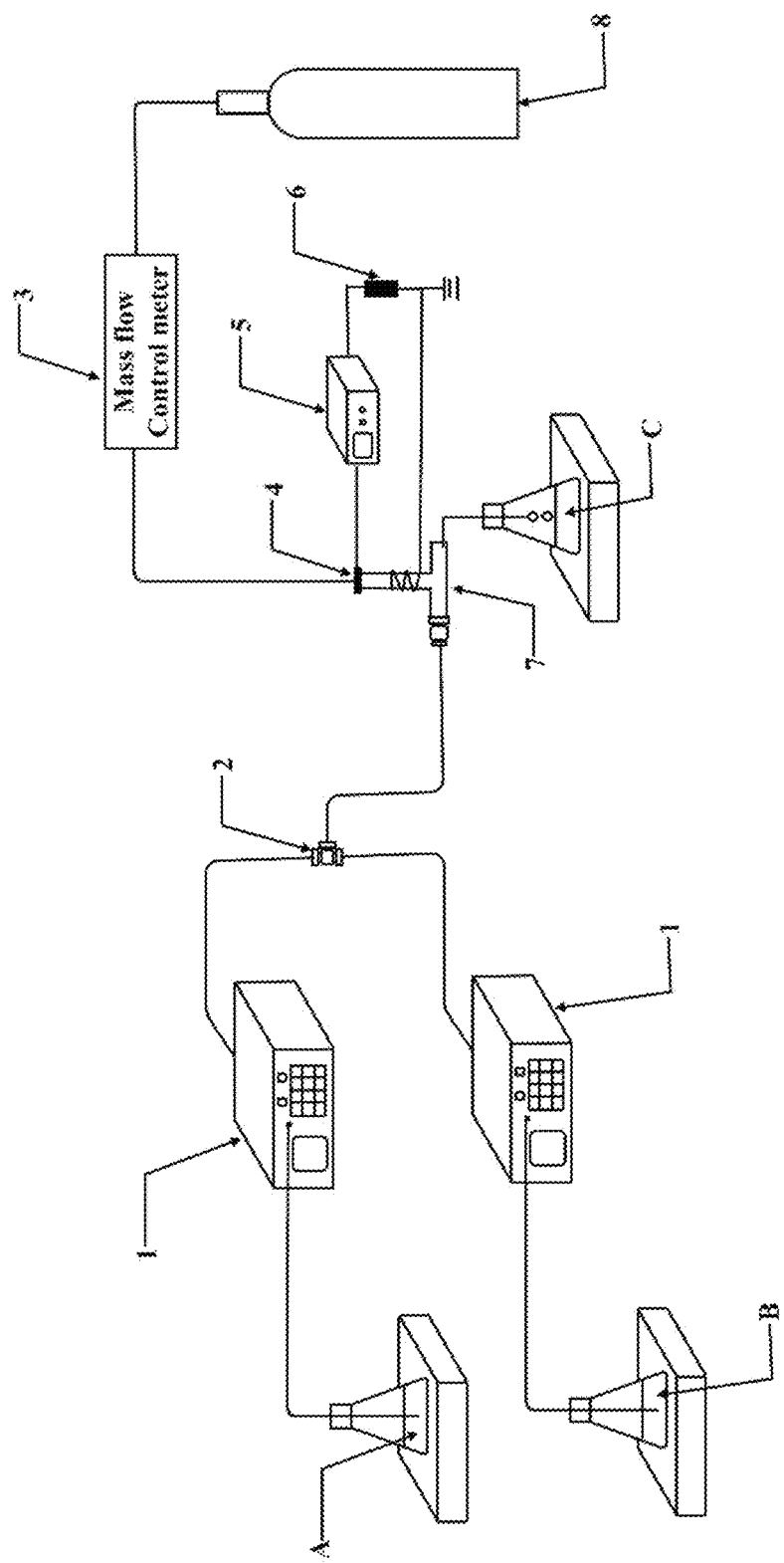
FIG. 1 is a structural schematic diagram of a device for continuously preparing nanoparticles comprising a noble metal or an alloy thereof.

A device comprises an argon cylinder, a mass flow control meter, injection pumps, a three-way valve, a three-way quartz tube microreactor, a plasma power supply, a ballast and a stainless steel electrode (as shown in FIG. 1).

The present invention is further described below in combination with implementation. However, the present invention is not limited to the following embodiments.

Embodiment 1

As shown in FIG. 1, a device for continuously preparing nanoparticles comprising a noble metal or an alloy thereof comprises two injection pumps 1, a three-way valve 2, a mass flow control meter 3, a stainless steel electrode 4, a plasma power supply 5, a ballast 6, a three-way quartz tube microreactor 7 and an argon cylinder 8. The left end of the three-way quartz tube microreactor 7 is connected with a polytetrafluoroethylene pipeline of a microchannel, the upper end is connected with the stainless steel electrode and the right end is used for a product to flow out to collect the product into a container C.

An appropriate amount of chloroauric acid is weighed and added into deionized water, uniformly stirred and prepared into a reaction solution with a concentration of 0.1 mM. 10 mL of reaction solution and 2.5 ml of 1% PVA are placed in a container A, and the microchannel and the plasma are coupled through the three-way quartz tube microreactor 7.

After a reaction device is connected, argon gas of 30 sccm is introduced into a system to eliminate impurity gas. DC negative bias is applied to a fixed stainless steel tube cathode in the atmosphere of argon to break through the argon to generate the plasma, to ensure plasma power of 10 W. The flow velocity of the precursor solution is controlled as 0.5 mL/min through the injection pumps after the plasma is ignited; the chloroauric acid solution is delivered to a plasma region, and gold ions are rapidly reduced into gold nanoparticles under the action of the plasma; the colloid of nanogold is centrifuged at 8000 r/min and dried at 50° C. for 5 h to obtain nanogold powder.

Embodiment 2

The treatment technology and operating conditions are the same as those in embodiment 1, but the difference is that: the precursor is 0.1 mM of silver nitrate solution.

Figure 2:
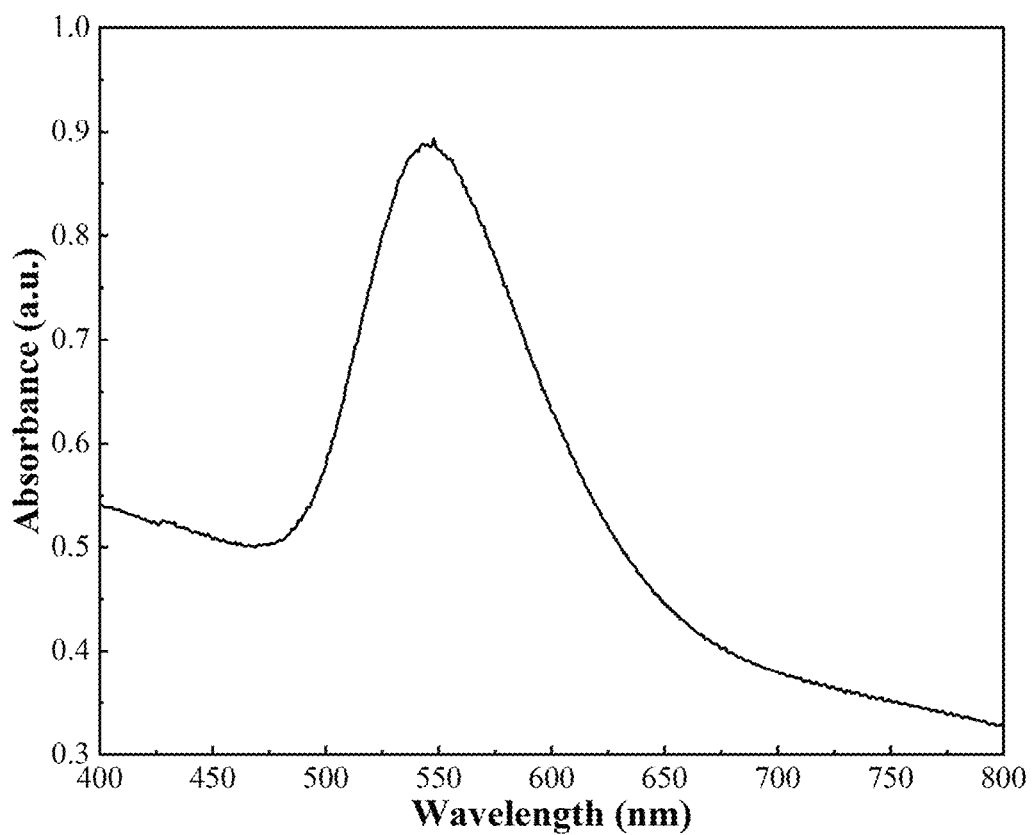
FIG. 2 shows the ultraviolet absorption spectrum of a gold colloid prepared in embodiment 1 of the present invention.
Figure 3:
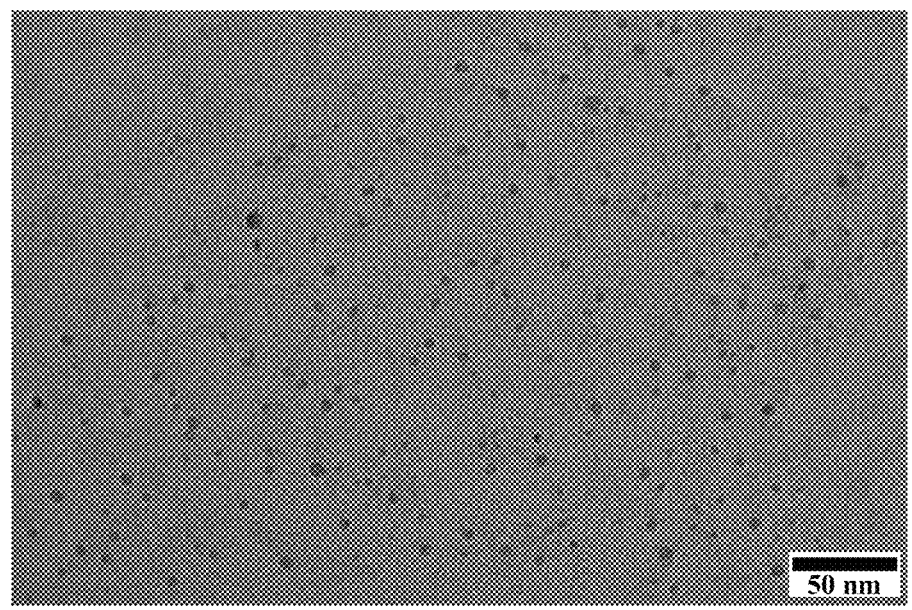
FIG. 3 shows the TEM morphology of gold nanoparticles prepared in embodiment 1 of the present invention.
Figure 4:
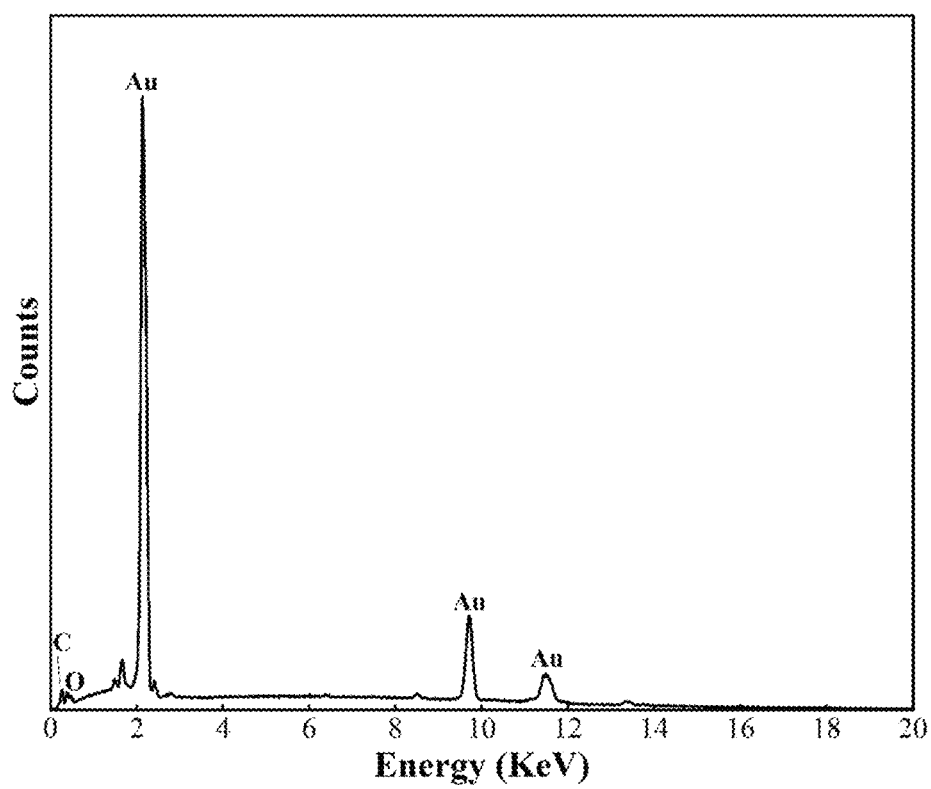
FIG. 4 shows the EDX map of gold nanoparticles prepared in embodiment 1 of the present invention.
Figure 5:
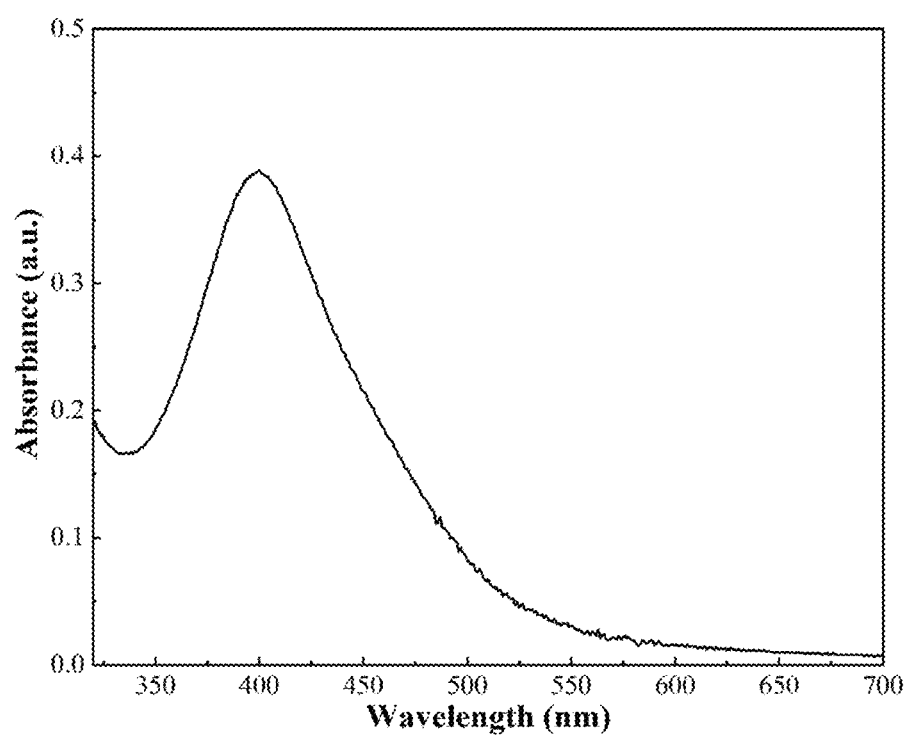
FIG. 5 shows the ultraviolet absorption spectrum of a silver colloid prepared in embodiment 2 of the present invention.
Figure 6:
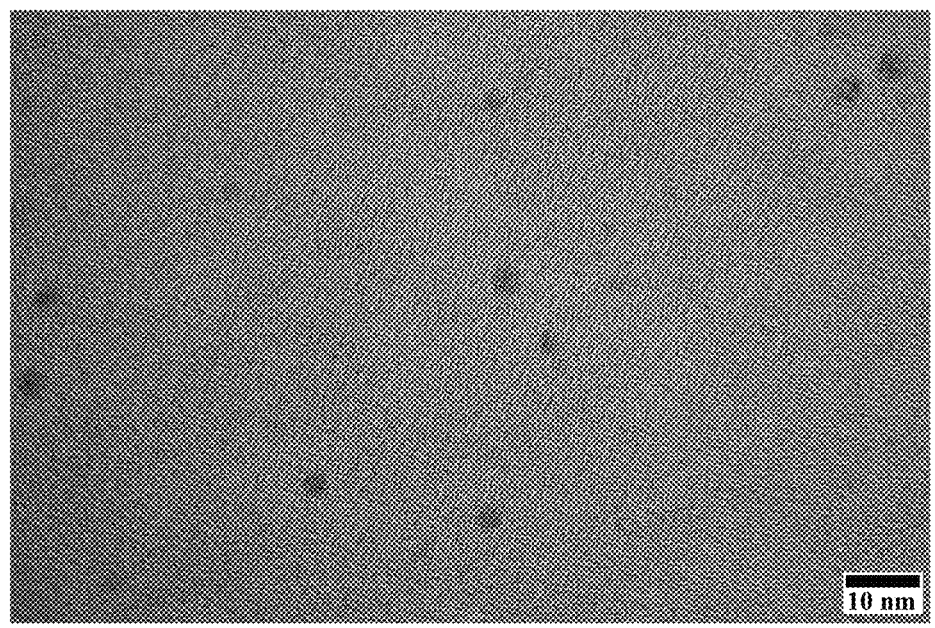
FIG. 6 shows the TEM morphology of silver nanoparticles prepared in embodiment 2 of the present invention.
Figure 7:
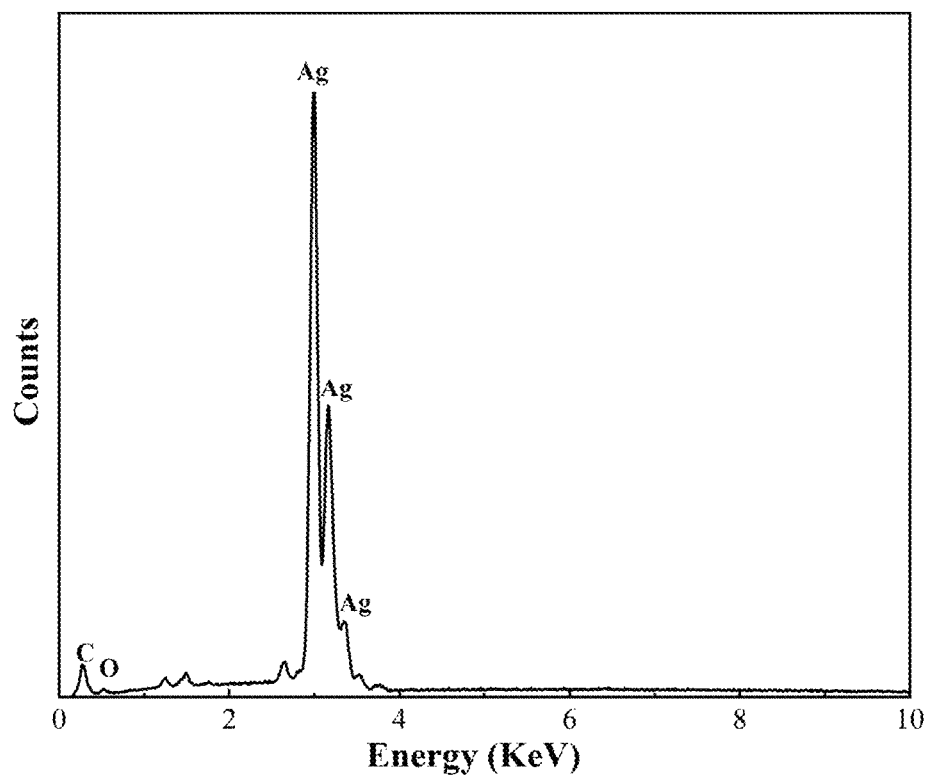
FIG. 7 shows the EDX map of silver nanoparticles prepared in embodiment 2 of the present invention.

It can be seen from FIG. 2 and FIG. 5 that the gold nanoparticles and the silver nanoparticles respectively have characteristic absorption peaks at 548 nm and 400 nm due to special surface plasma resonance, which indicates that the gold nanoparticles and the silver nanoparticles are successfully prepared by the method. It can be seen from the TEM images of FIG. 3 and FIG. 6 that the prepared gold nanoparticles and silver nanoparticles have narrow particle size distribution and good uniformity. It can be seen from X-ray energy dispersion spectra of FIG. 4 and FIG. 7 that except for small amounts of carbon and oxygen (from a carbon film on a copper grid and air), the contents of gold and silver are 96% and 95% respectively, which indicates that the synthesized gold and silver nanoparticles have no impurity and high purity.

Embodiment 3

The treatment technology and operating conditions are the same as those in embodiment 1, but the differences are that: 10 mL of 3 mM silver nitrate and 2.5 ml of 1% PVA are placed in the container A, and 10 mL of 1 mM chloroauric acid solution and 2.5 ml of 1% PVA are placed in the container B.

Figure 8:
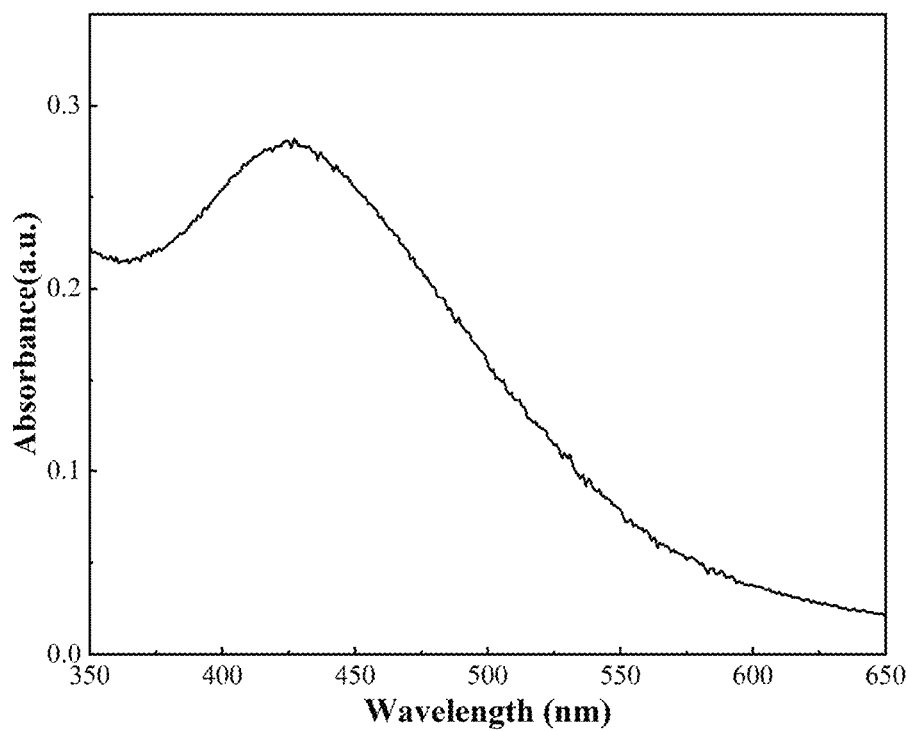
FIG. 8 shows the ultraviolet absorption spectrum of gold and silver alloy nanoparticles prepared in embodiment 3 of the present invention.
Figure 9:
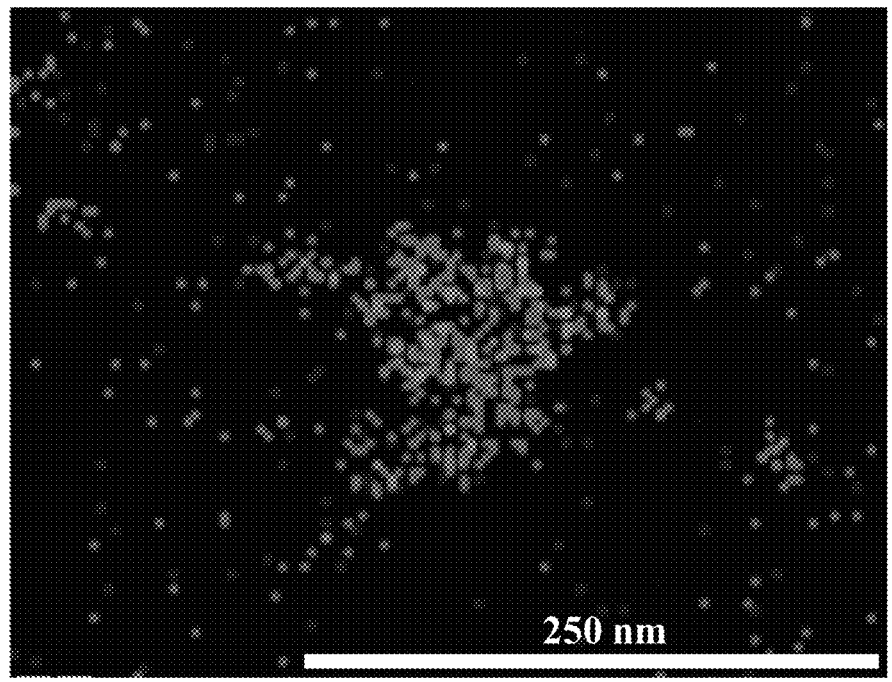
FIG. 9 shows the EDX map of gold and silver alloy nanoparticles prepared in embodiment 3 of the present invention.

It can be seen from FIG. 8 that when the mixture of silver nitrate and chloroauric acid is used as the precursor, the ultraviolet absorption peaks of the prepared colloid appear in the form of single peaks at 432 nm between the absorption peaks of gold and silver, which proves the formation of gold and silver alloy nanoparticles. It can also be visually seen from the energy spectrum map of gold and silver alloy in FIG. 9 that the prepared gold and silver alloy nanoparticles have good dispersibility.

Embodiment 4

The treatment technology and operating conditions are the same as those in embodiment 1, but the differences are that: 10 mL of 2 mM silver nitrate and 2.5 ml of 1% PVA are placed in the container A, and 10 mL of 2 mM chloroauric acid solution and 2.5 ml of 1% PVA are placed in the container B.

Embodiment 5

The treatment technology and operating conditions are the same as those in embodiment 1, but the differences are that: 10 mL of 1 mM silver nitrate and 2.5 ml of 1% PVA are placed in the container A, and 10 mL of 3 mM chloroauric acid solution and 2.5 ml of 1% PVA are placed in the container B.

Embodiment 6

1.5 mL of gold colloid prepared in embodiment 1 is mixed with 1.5 mL of silver colloid prepared in embodiment 2.

Figure 10:
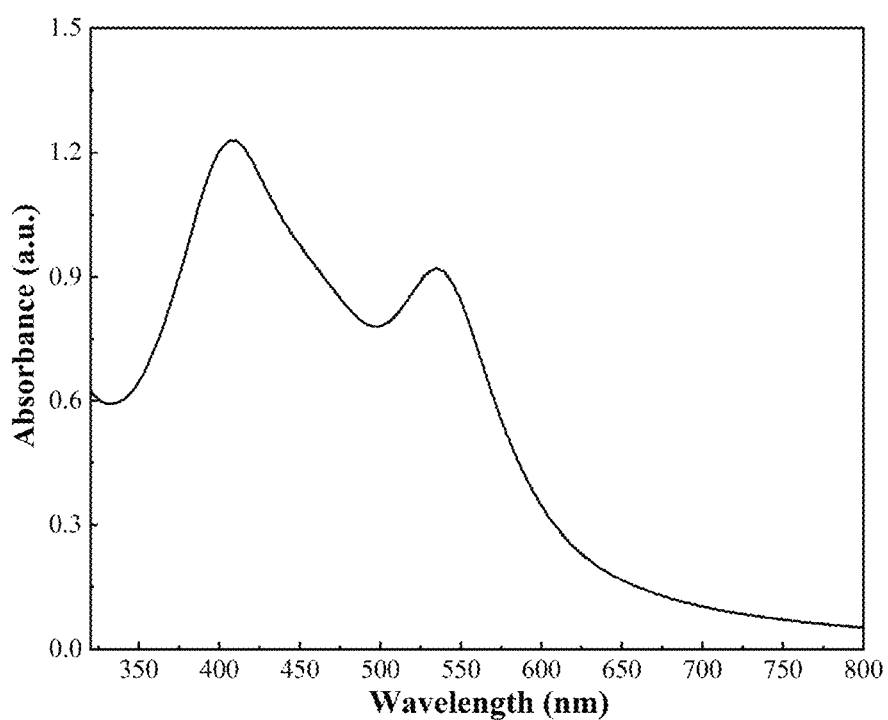
FIG. 10 shows the ultraviolet absorption spectrum of a gold and silver colloid mixture prepared in embodiment 6 of the present invention.
Figure 11:
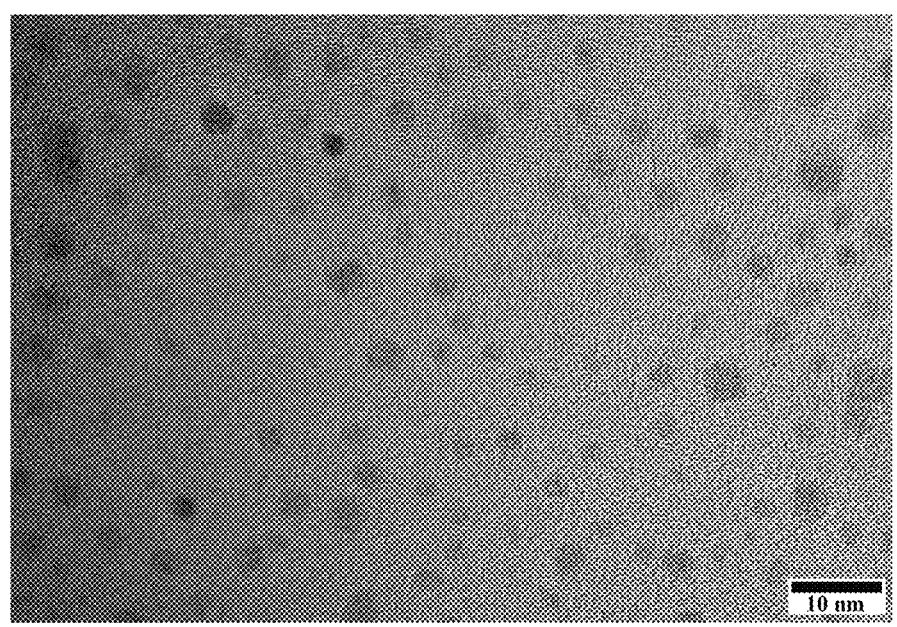
FIG. 11 shows the TEM morphology of gold and silver alloy nanoparticles prepared in embodiment 3 of the present invention.
Figure 12:
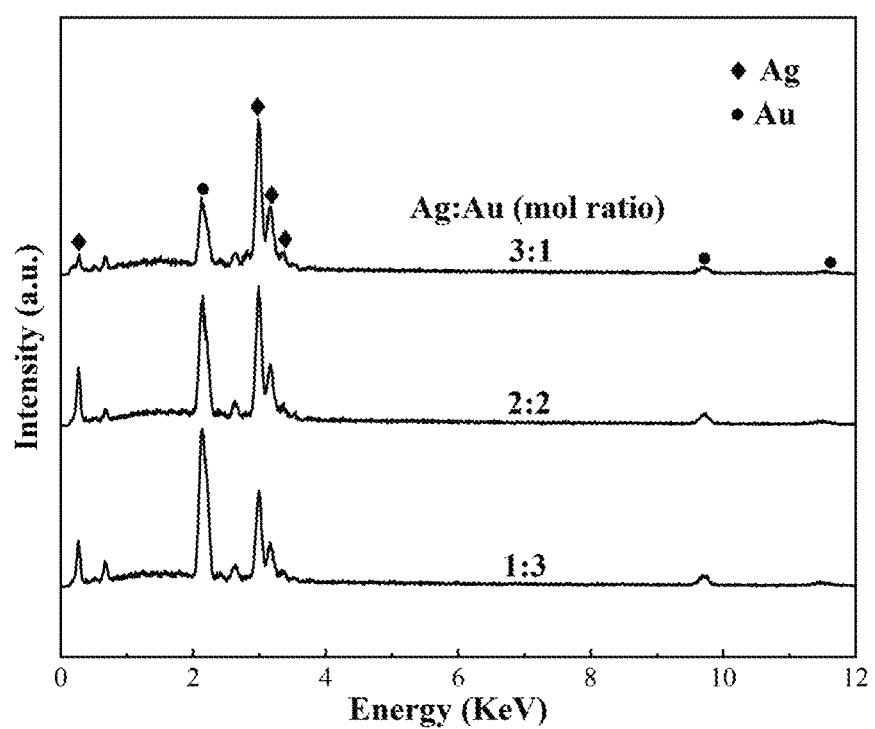
FIG. 12 shows the EDX map of gold and silver alloy nanoparticles prepared in embodiments 3, 4 and 5 of the present invention.

It can be seen from FIG. 10 that when separate gold and silver colloids are mixed, two ultraviolet absorption peaks appear, which further proves that the gold and silver alloy nanoparticles are obtained by the method. It can be seen from the TEM image of FIG. 11 that the prepared gold and silver alloy nanoparticles also have the characteristics of narrow particle size distribution and good uniformity. In addition, it can be seen from the X-ray energy dispersion spectra of FIG. 12 that the contents of gold and silver in the obtained gold and silver nanoparticles are changed with the change of the ratio of the chloroauric acid to the silver nitrate in the precursor, and meanwhile, no other impurity peaks are observed in the energy spectra, which indicates that controllable preparation of the gold and silver alloy nanoparticles can be realized by the method and the synthesized gold and silver alloy has no impurity and high purity.

The above embodiments are only used for clearly describing the technological process of the present invention, but the present invention is not limited to the above embodiments. For those ordinary skilled in the art, various modifications, changes and improvements can be derived without departing from the principle of the present invention, and shall also fall within the protection scope of the present invention.

The invention claimed is:

1. A method for continuously preparing nanoparticles comprising a noble metal or an alloy thereof, completed by a device, coupling microreactor and plasma technology, using noble metal solution as precursor, continuously delivering the precursor solution into a three-way quartz tube microreactor through injection pumps and rapidly reducing a reaction solution into nanoparticles under the action of plasma, wherein the device comprises an argon cylinder, a mass flow control meter, the injection pumps, a three-way valve, the three-way quartz tube microreactor, a plasma power supply, a ballast and a stainless steel electrode; one end of the three-way quartz tube microreactor is respectively connected with two injection pumps through a microchannel and the three-way valve; the two injection pumps are respectively connected with a container A and a container B for delivering a precursor solution; the other end of the three-way quartz tube microreactor is connected with a container C for product output; the upper end of a quartz tube of the three-way quartz tube microreactor is provided with the stainless steel electrode as a cathode; a metal coil is wound outside as a grounding anode; the three-way quartz tube microreactor, the plasma power supply and the ballast form a closed circuit; the stainless steel electrode is also connected with the mass flow control meter and the argon cylinder in sequence; the stainless steel electrode has a tube length of 50-100 mm, internal pipe diameter of 1-2.6 mm and external pipe diameter of 1.5-3.2 mm;

wherein the method comprises the following steps:

preparing noble metal precursor solution with concentration of 0.01-5 mM noble metal precursor and deionized water as a solvent as the reaction solution, and adding 1%-5% of PVA into the reaction solution to ensure stable nanoparticles in colloidal solution, wherein ratio of the volume of reaction solution to the volume of 1%-5% of PVA is 10:1 to 1:1; PVA is polyvinyl alcohol; 1%-5% of PVA is aqueous solution of PVA with a mass fraction of 1%-5%;

coupling the microchannel and the plasma power supply using the three-way quartz tube microreactor, and introducing an atmosphere of argon into the microreactor through the mass flow control meter to eliminate impurity gas in the microreactor;

applying DC negative bias to the fixed stainless steel electrode in the atmosphere of argon to ensure the plasma power of 10-20 W to break through the argon to generate the plasma;

igniting the plasma and controlling the flow velocity of the precursor solution as 0.1-1 mL/min after the plasma is ignited, delivering the precursor solution to a plasma region, and rapidly reducing noble metal ions to generate nanoparticles under the action of the plasma;

allowing the generated nanoparticles to flow out from the right end of the three-way quartz tube microreactor under the push of the solution, and collecting the nanoparticles into the container C;

centrifuging and drying the nanoparticles to obtain nanoparticles comprising a noble metal or an alloy thereof and having particle sizes of 3-8 nm.

2. The method for continuously preparing nanoparticles comprising the noble metal or the alloy thereof according to claim 1, wherein a spacing between the cathode and the anode is kept at 2-3 mm.

3. The method for continuously preparing nanoparticles comprising the noble metal or the alloy thereof according to claim 1, wherein the three-way quartz tube microreactor has a total tube length of 70-150 mm, internal pipe diameter of 1.5-3.6 mm and external pipe diameter of 2-5 mm.

4. The method for continuously preparing nanoparticles comprising the noble metal or the alloy thereof according to claim 1, wherein the three-way valve has an internal diameter of 1.5-3.2 mm.

5. The method for continuously preparing nanoparticles comprising the noble metal or the alloy thereof according to claim 1, wherein the microchannel for delivering the precursor solution is a polytetrafluoroethylene tube and has a tube length of 30-50 cm, internal pipe diameter of 1-3 mm and external pipe diameter of 1-3 mm.

6. The method for continuously preparing nanoparticles comprising the noble metal or the alloy thereof according to claim 1, wherein the noble metal precursor is one or more of silver nitrate, chloroauric acid, chloroplatinic acid, palladium chloride and palladium nitrate.

7. The method for continuously preparing nanoparticles comprising the noble metal or the alloy thereof according to claim 1, wherein the centrifuging is at a centrifugal speed of 8000-10,000 r/min and the drying is for a time of 4-8 hr at a temperature of 50-80° C.

* * * * *